United States Patent
Li et al.

(10) Patent No.: US 11,391,641 B1
(45) Date of Patent: Jul. 19, 2022

(54) CALIBRATION SYSTEM FOR PRESSURE SENSOR

(71) Applicant: INDUSTRIAL TECHNOLOGY RESEARCH INSTITUTE, Hsinchu (TW)

(72) Inventors: Jen-Chieh Li, Tainan (TW); Tzung-Ching Lee, Hsinchu County (TW); Yu-Wen Hsu, Tainan (TW); Chao-Ta Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/234,260

(22) Filed: Apr. 19, 2021

(30) Foreign Application Priority Data

Dec. 25, 2020 (TW) .................................. 109146276

(51) Int. Cl.
*G01L 27/00* (2006.01)
*G01F 25/10* (2022.01)

(52) U.S. Cl.
CPC ............ *G01L 27/005* (2013.01); *G01F 25/10* (2022.01); *G01L 27/007* (2013.01)

(58) Field of Classification Search
CPC ...... G01F 25/10; G01L 27/005; G01L 27/007
See application file for complete search history.

(56) References Cited

U.S. PATENT DOCUMENTS

| | | | |
|---|---|---|---|
| 3,699,849 A | 10/1972 | Zawadski | |
| 3,777,546 A | 12/1973 | Rollins | |
| 4,590,791 A | 5/1986 | Reed | |
| 4,776,201 A | 10/1988 | Jones | |
| 6,848,292 B2 | 2/2005 | Joseph | |
| 9,476,790 B2 | 10/2016 | Kajikawa | |
| 2017/0097181 A1 | 4/2017 | Chung | |

(Continued)

FOREIGN PATENT DOCUMENTS

| | | |
|---|---|---|
| CN | 102445303 A | 5/2012 |
| CN | 204165699 U | 2/2015 |
| CN | 104792457 B | 7/2015 |

(Continued)

OTHER PUBLICATIONS

Taiwan Office Action dated Jun. 17, 2021 as received in application No. 109146276.

(Continued)

*Primary Examiner* — Ryan D Walsh
(74) *Attorney, Agent, or Firm* — Maschoff Brennan (57) ABSTRACT

A calibration system for calibrating pressure sensor comprises communication pipe, base, inlet valve, outlet valve, pump, inlet pipe, heater and reference pressure sensor. The communication pipe has first and second openings. The base comprises chamber body and outlet being disposed at the chamber body. The inlet valve is disposed at the first opening. The chamber body is connected to the second opening so as to define a space between the inlet valve and the outlet valve. The heater is to heat a fluid in the space. The reference pressure sensor is configured to measure a pressure of the fluid. The at least one target pressure sensor is detachably mounted on the chamber body via the base so as to measure the pressure of the fluid in the space.

23 Claims, 3 Drawing Sheets

(56) References Cited

U.S. PATENT DOCUMENTS

2019/0277720 A1  9/2019  Neumaier et al.

FOREIGN PATENT DOCUMENTS

| | | | |
|---|---|---|---|
| CN | 105181242 A | 12/2015 | |
| CN | 107014741 A | 8/2017 | |
| CN | 107356370 A | 11/2017 | |
| CN | 110082031 A | 8/2019 | |
| CN | 110579310 A | 12/2019 | |
| CN | 111157176 A | 5/2020 | |
| DE | 10359866 A1 | 7/2005 | |
| EP | 0694774 A1 * | 1/1996 | |
| JP | 3205321 U * | 7/2016 | |
| TW | M448675 | 3/2013 | |
| WO | WO-2013110255 A1 * | 8/2013 | ........... G01L 27/005 |

OTHER PUBLICATIONS

A Study on Static Calibration Method for Pressure Sensor Based on Static Pressure Calibration Device.

* cited by examiner

CALIBRATION SYSTEM FOR PRESSURE SENSOR

CROSS-REFERENCE TO RELATED APPLICATIONS

This non-provisional application claims priority under 35 U.S.C. § 119(a) on Patent Application No(s). 109146276 filed in Taiwan (R.O.C.) on Dec. 25, 2020, the entire contents of which are hereby incorporated by reference.

TECHNICAL FIELD

The disclosure relates to a calibration system, more particularly to a calibration system using pressure sensor.

BACKGROUND

Generally, IC chip and printed circuit board are manufactured by using etching process. Thus, the apparatus of the etching process involves pipes through which the etching liquid flows. To ensure the safety control of the etching liquid, the conditions of the etching liquid, such as flow speed, temperature, and pressure, are monitored by sensors are equipped in the pipes. To ensure the accuracy of the measurement of the sensors, the sensors are needed to be calibrated regularly.

A typical calibration system has a communication pipe equipped with a sensor to be calibrated and a reference pressure sensor which are arranged at different locations at the calibration system. The fluid used in the calibration system is heated up to a predetermined temperature and then transmitted into the communication pipe, and the fluid in the communication pipe is forced up to a predetermined pressure by a pump. By doing so, the pressure values measured by the reference pressure sensor can be used to calibrate the sensor to be calibrated.

However, it is time consuming and energy consuming to heat the whole fluid in the calibration system to the predetermined temperature. During the fluid flows through the communication pipe, the heat loss occurs such that the calibration process is costly and not effective. Thus, how to overcome the above problems is an important topic in the fields of sensor calibration.

SUMMARY

One embodiment of the disclosure provides a calibration system for calibrating at least one target pressure sensor, comprising a communication pipe, a base, an inlet valve, an outlet valve, a pump, an inlet pipe, a heater, and a reference pressure sensor. The communication pipe has a first opening and a second opening. The base comprises a chamber body and has an outlet being disposed at one end of the chamber body. The inlet valve is connected to the first opening. The outlet valve is disposed at the outlet. Another end of the chamber body is connected to the second opening of the communication pipe. The communication pipe communicates with the chamber body, and the communication pipe and the chamber body define a space located between the inlet valve and the outlet valve. The inlet pipe is connected to the pump and the inlet valve. The heater is configured to heat a fluid in the space. The reference pressure sensor is disposed on the communication pipe and configured to measure a pressure of the fluid in the space. The at least one target pressure sensor is detachably mounted on the chamber body to measure the pressure of the fluid in the space.

According to calibration system as discussed in the above embodiments of the disclosure, the heater and the reference pressure sensor are disposed in the communication pipe and the sensor needed to be calibrated is disposed in the chamber body, such that the heater is to heat the fluid existing in the space defined by the communication pipe and the chamber body. Thus, in the calibration system, the volume of the fluid needed to be heated is reduced, such that the time and energy that are required by running the heater are reduced, thereby significantly saving the time and energy devoted to sensor calibration.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

The following embodiments will be described with reference to the drawings. For the purpose of clear illustration, some conventional elements and components may be illustrated in a simple and clear manner. Some of the features in the drawings may be slightly exaggerated or illustrated in a larger proportion for the ease of viewing but are not intended to limit the disclosure. In addition, for the same reason, some of the elements or components in the drawings may be illustrated in dotted lines.

Herein, the terms, such as "end", "part", "portion", "area", may be used to refer to specific features of or between elements or components but are not intended to limit the elements and components. In addition, the terms, such as "substantially" and "approximately", as used herein may mean a reasonable amount of deviation of the described term such that the end result is not significantly changed.

Further, unless explicitly stated, the term "at least one" as used herein may mean that the quantity of the described element or component is one or larger than one but does not necessarily mean that the quantity is only one. The term "and/or" may be used herein to indicate that either or both of two stated possibilities.

Figure 1:
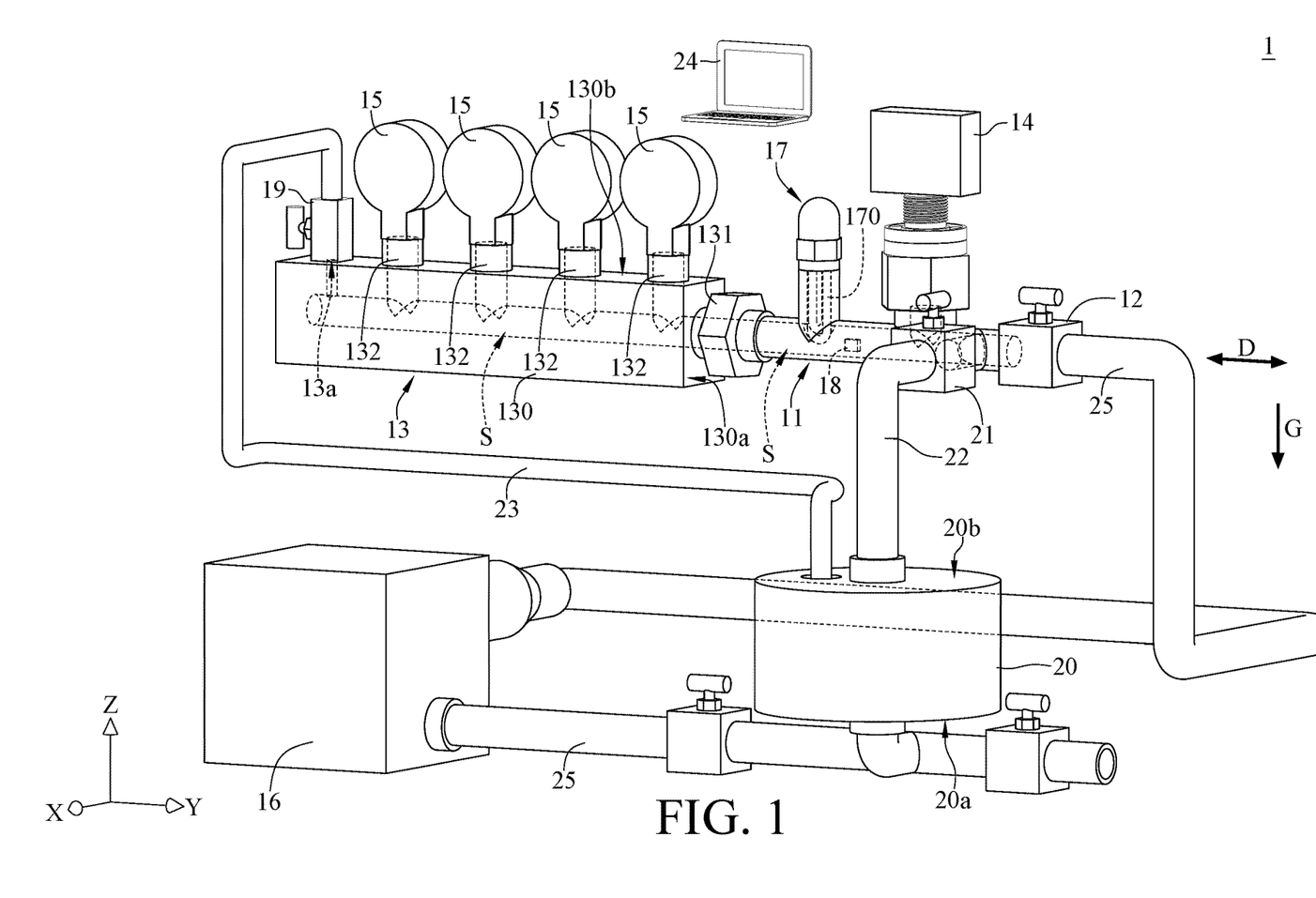
FIG. 1 is a perspective view of a calibration system according to one embodiment of the disclosure.
Figure 2:
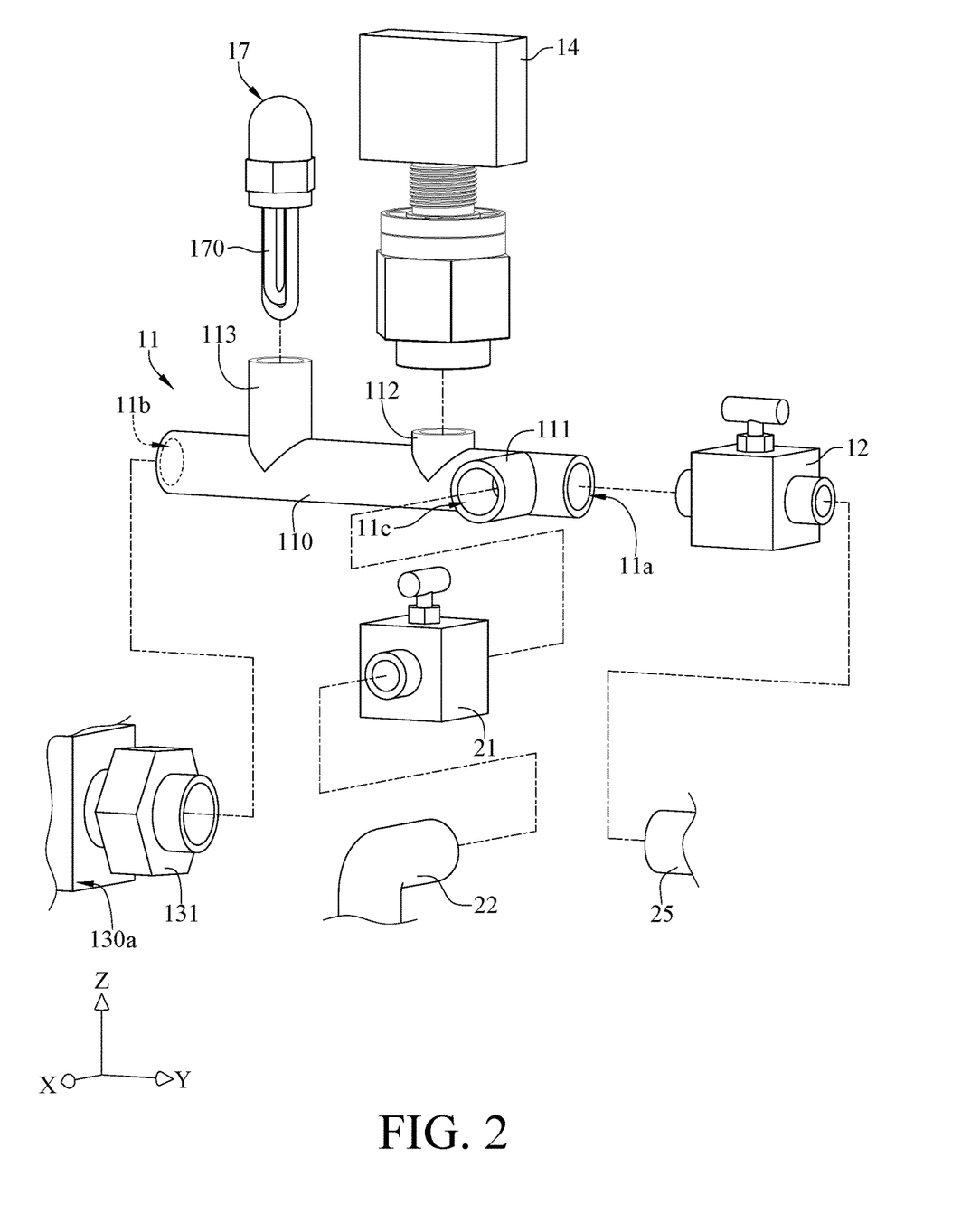
FIG. 2 is a partially-enlarged exploded view of the calibration system in FIG. 1.

Firstly, referring to FIG. 1 and FIG. 2, where there are shown a perspective view of a calibration system 1 according to one embodiment of the disclosure and a partially-enlarged exploded view of the calibration system 1.

As shown in FIG. 1, in this embodiment, the calibration system 1 includes a communication pipe 11, an inlet valve 12, a base 13, a reference pressure sensor 14, a plurality of target pressure sensors 15 that are needed to be calibrated, a pump 16, a heater 17, and an inlet pipe 25. In addition, the calibration system 1 may further include a temperature sensor 18, an outlet valve 19, a storage tank 20, a retrieving valve 21, a retrieving pipe 22, an outlet pipe 23, and a controller 24, but some of these devices are optional and not intended to limit the disclosure. For example, the calibration systems in some other embodiments may omit the temperature sensor 18, the outlet valve 19, the storage tank 20, the retrieving valve 21, the retrieving pipe 22, the outlet pipe 23 and the controller 24.

As shown in FIG. 1 and FIG. 2, in this embodiment, the communication pipe 11 includes a main pipe 110, a first branch pipe 111, a second branch pipe 112 and a third branch pipe 113. The communication pipe 11 includes a first opening 11a, a second opening 11b and a third opening 11e. The main pipe 110 extends along an extension direction D. The first branch pipe 111, the second branch pipe 112 and the third branch pipe 113 are disposed sequentially along the main pipe 110 and communicate with the main pipe 110 respectively. The third branch pipe 113 is longer than the second branch pipe 112. The first branch pipe 111 extends in a direction substantially perpendicular to the extension direction D of the main pipe 110, and the extension direction of the first branch pipe 111 is substantially perpendicular to that of the second branch pipe 112 and the third branch pipe 113 as well. The second branch pipe 112 and the third branch pipe 113 extend in the same direction and their extension directions both are substantially perpendicular to the extension direction D of the main pipe 110. That is, the second branch pipe 112 and the third branch pipe 113 are substantially perpendicular to the first branch pipe 111. The first opening 11a and the second opening 11b are respectively located at two opposite ends of the main pipe 110. The third opening 11c is located at the end of the first branch pipe 111. As shown, a coordinate system is provided for spatial interpretations, where the extension direction D is parallel to the y-axis. The first branch pipe 111 is parallel to the x-axis and extends outward from the main pipe 110 along the positive x-direction, the second branch pipe 112 and the third branch pipe 113 are parallel to the z-axis and extend outward from the main pipe 110 along the positive z-direction. The direction of gravity G points toward the negative z-direction. Note that the coordinate system is exemplary and merely for ease of understanding the disclosure. It is also noted that the first branch pipe 111 is optional, and in some other embodiments, the first branch pipe 111 and the third opening 11e are omitted.

As shown in FIG. 1, in this embodiment, the inlet valve 12 is connected to the first opening 11a. The inlet pipe 25 is connected to the inlet valve 12. The base 13 includes a chamber body 130, a first connector 131, and a plurality of second connectors 132. The chamber body 130 includes a side surface 130a and a top surface 130b located adjacent to each other. The side surface 130a of the chamber body 130 faces towards the positive y-direction. The top surface 130b of the chamber body 130 faces towards the positive z-direction. The base 13 includes an outlet 13a. The outlet 13a is disposed on the top surface 130b of the chamber body 130. The outlet valve 19 is disposed at the outlet 13a of the base 13 and located on the top surface 130b of the chamber body 130. The first connector 131 is detachably mounted on the side surface 130a of the chamber body 130. The term "detachably mounted" used herein has a broad meaning and it generally means that one named component has the capability to be directly or indirectly attached, connected, installed, or secured to the other named component and is also able to be separated, disconnected, unfastened, or released from the other named component. The second connectors 132 are detachably mounted on the top surface 130b of the chamber body 130.

The first connector 131 is detachably mounted at the second opening 11b of the communication pipe 11. In such an arrangement, the chamber body 130 is connected to the second opening 11b of the communication pipe 11 via the first connector 131. That is, the chamber body 130 communicates with the pipe 11. The term "communicate" used herein means that a fluid (e.g., gas or liquid) can directly or indirectly flow through the named components. And there is a space S defined by the communication pipe 11 and the chamber body 130 and the space S is located between the inlet valve 12 and the outlet valve 19.

The reference pressure sensor 14 is connected to the second branch pipe 112 of the communication pipe 11. The reference pressure sensor 14 is configured to measure the pressure of the fluid existing in the space S. The target pressure sensors 15 needed to be calibrated are detachably mounted on the chamber body 130 of the base 13 by being respectively detachably mounted at the second connectors 132 of the base 13. Each of the target pressure sensors 15 is configured to measure the hydraulic pressure in the space S. Thus, the reference pressure sensor 14 and the target pressure sensors 15 are all provided to detect the hydraulic pressure of the same space S. The fluid existing in the space S would apply the same pressure to the reference pressure sensor 14 and the target pressure sensors 15, however, due to unexpected factors, such as manufacturing defects, material aging, change of environmental conditions (e.g., temperature changes or humidity changes), the pressure values measured by the target pressure sensors 15 might not be the same as that obtained by the reference pressure sensor 14. When the pressure value measured by the target pressure sensor 15 is different from that measured by the reference pressure sensor 14, the pressure sensor 15 is needed to be calibrated using the calibration system 1. In addition, the inlet pipe 25 is connected to the pump 16 and the inlet valve 12, where the inlet valve 12 is located between the pump 16 and the reference pressure sensor 14, and the pump 16 is configured to force the fluid in the space S.

The heater 17 is disposed at the third branch pipe 113 of the communication pipe 11. The heater 17 has a heating portion 170 disposed in the third branch pipe 113 of the communication pipe 11 and extending toward the main pipe 110 of the communication pipe 11. The heater 17 is configured to heat the fluid in the space S defined by the communication pipe 11 and the chamber body 130. In the extension direction D, the heating portion 170 of the heater 17 is arranged between the second opening 11b of the communication pipe 11 and the reference pressure sensor 14. In other words, the heating portion 170 of the heater 17 is located between the base 13 and the reference pressure sensor 14. Thus, the heating portion 170 of the heater 17 is used to heat the fluid around the reference pressure sensor 14 and the target pressure sensors 15 up to the same temperature within a short time period when heating the fluid in the space S.

In this embodiment, the temperature sensor 18 is disposed in the communication pipe 11, but the disclosure is not limited thereto. In some other embodiments, the temperature sensor 18 may be arranged on the outer surface of the communication pipe 11. In this embodiment, the temperature sensor 18 is configured to measure the temperature of the fluid in the space S defined by the communication pipe 11 and the chamber body 130. Note that the temperature sensor 18 is optional. In some other embodiments without the temperature sensor 18, the targeted temperature can be obtained by supplying the energy calculated from parameters such as the volume of the space S, the density of the fluid and specific heat of the fluid.

In this embodiment, the storage tank 20 has a bottom surface 20a and a top surface 20b. The bottom surface 20a of the storage tank 20 faces towards the negative z-direction. The top surface 20b of the storage tank 20 faces towards the positive z-direction. The inlet pipe 25 communicates with the storage tank 20, the pump 16, and the inlet valve 12. In detail, the bottom surface 20a of the storage tank 20 is connected to the pump 16 via the inlet pipe 25, and the pump 16 is connected to the inlet valve 12 via the inlet pipe 25. Along the inlet pipe 25, the pump 16 is arranged between the storage tank 20 and the first opening 11a of the communication pipe 11. Specifically, the pump 16 is arranged between the storage tank 20 and the inlet valve 12. The storage tank 20 is arranged at lower level with respect to the communication pipe 11 and the chamber body 130 in the direction of gravity G. In other words, the storage tank 20 is arranged at lower level with respect to the communication pipe 11 and the chamber body 130 in the negative z-direction. That is, the storage tank 20 is located lower than the communication pipe 11 and the chamber body 130, so that the potential energy of the storage tank 20 is lower than that of the communication pipe 11 and the chamber body 130. The retrieving valve 21 is connected to the third opening 11e of the communication pipe 11. The retrieving pipe 22 is connected to the retrieving valve 21 and the top surface 20b of the storage tank 20. The outlet pipe 23 is connected to the outlet valve 19 and the top surface 20b of the storage tank 20.

The reference pressure sensor 14 is used to measure the pressure of the fluid in the space S. The target pressure sensors 15 are also used to measure the pressure of the fluid in the space S. The heater 17 is used to heat the fluid in the space S. And the temperature sensor 18 is used to measure the temperature of the fluid in the space S.

When the inlet valve 12, the outlet valve 19, and the retrieving valve 21 are closed, the space S defined by the communication pipe 11 and the chamber body 130 is sealed. At this moment, the reference pressure sensor 14 and the target pressure sensors 15 are used to measure the pressure of the fluid in the sealed space S. The heater 17 is used to heat the fluid in the sealed space S, and the temperature sensor 18 is used to measure the temperature of the fluid in the sealed space S. By doing so, the heater 17 only needs to heat the fluid existing in the sealed space S. It is not necessary to heat the fluid existing in the inlet pipe 25 from the inlet valve 12 to the pump 16 and it is not necessary to heat the fluid existing in the inlet pipe 25 from the pump 16 to the storage tank 20. There is also no need to heat the fluid existing in the storage tank 20. In other words, the heater 17 does not need to heat the all fluid in the calibration system 1 when the space S is sealed. Thus, the volume of the fluid needed to be heated is relatively small. It can save the time and energy required for the heater 17 during the calibration.

The controller 24 is electrically connected to the inlet valve 12, the pump 16, the heater 17, the temperature sensor 18, the outlet valve 19, and the retrieving valve 21.

The controller 24 is configured to control the pump 16 to pump the fluid in the storage tank 20 into the space S defined by the communication pipe 11 and the chamber body 130. The controller 24 is configured to open or close the inlet valve 12. When the inlet valve 12 is opened, the fluid is allowed to flow over the space S. When the inlet valve 12 is closed, the fluid is stopped flowing into the space S. When the controller 24 opens the inlet valve 12 to allow the fluid to flow into the space S, the controller 24 controls the pump 16 to force the fluid in the space S defined by the communication pipe 11 and the chamber body 130 up to a predetermined pressure. When the pressure of the fluid in the space S is increased to the predetermined pressure by the pump 16, the controller 24 closes the inlet valve 12 to stop the fluid flowing into the space S.

The controller 24 is configured to control the heater 17 to heat the fluid in the space S up to a predetermined temperature. The controller 24 controls the heater 17 according to the temperature detected by the temperature sensor 18. The controller 24 is configured to open or close the outlet valve 19. When the outlet valve 19 is opened, the fluid is allowed to flow out of the space S. When the space S defined by the communication pipe 11 and the chamber body 130 is filled with the fluid, the controller 24 can close the outlet valve 19 to stop the fluid flowing out of the space S. The controller 24 is configured to open or close the retrieving valve 21. When the retrieving valve 21 is opened, the fluid in the space S is allowed to flow into the storage tank 20.

The controller 24 is also configured to record the pressure values detected by the reference pressure sensor 14 and the pressure values detected by the target pressure sensors 15. The controller 24 is configured to calibrate at least one of the target pressure sensors 15 based on the predetermined pressure and the predetermined temperature. The calibration system 1 is able to simulate various environments for the calibration of the target pressure sensors 15 by changing several factors such as the states of the inlet valve 12 and the outlet valve 19, and the temperature and pressure of the fluid in the space S. It ensures that the calibrated target pressure sensor 15 will be highly accurate under various environments. The following descriptions are related to how the calibration system 1 simulates various environments for the calibration of the target pressure sensor 15.

Figure 3:
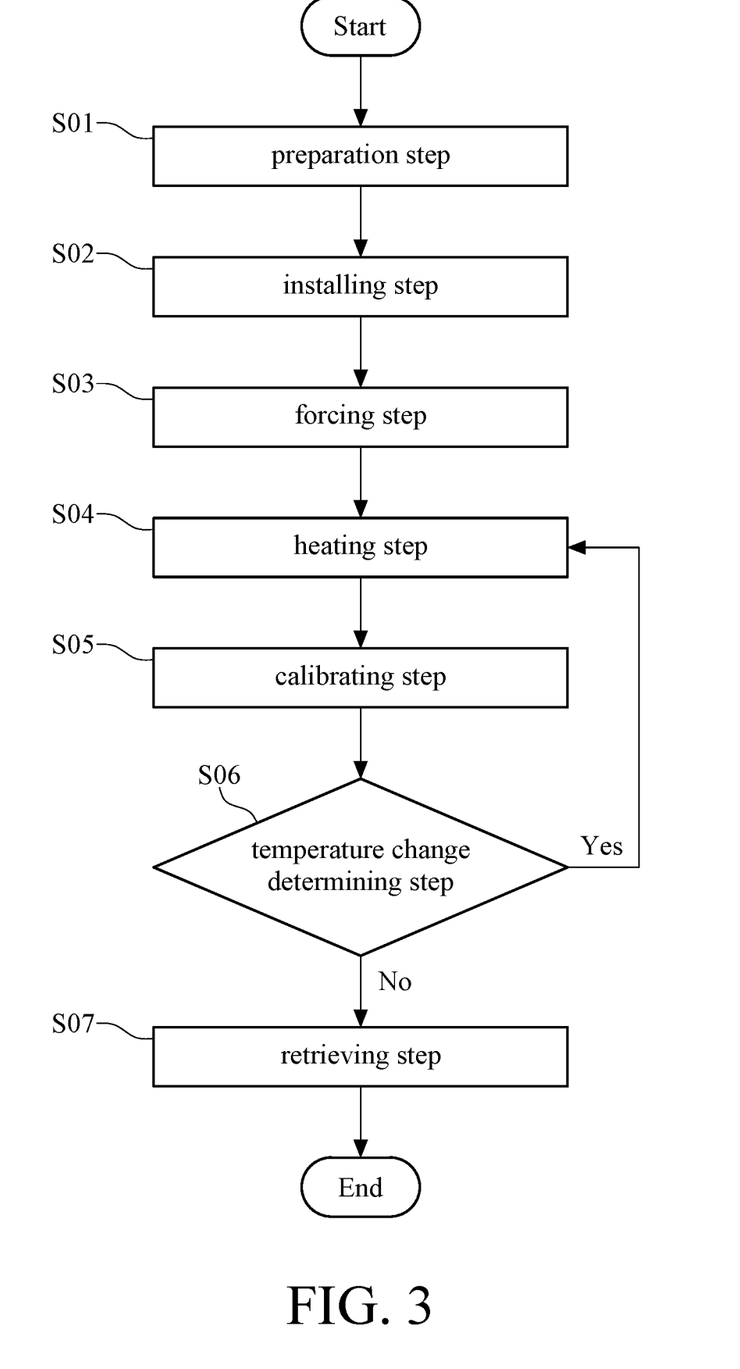
FIG. 3 is a flowchart showing the usage of the calibration system in FIG. 1.

Referring to FIG. 1 and FIG. 3, where FIG. 3 is a flowchart showing the usage of the calibration system 1. As shown, the method of using the calibration system 1 at least includes executing the following steps: a preparation step S01, an installing step S02, a forcing step S03, a heating step S04, a calibrating step S05, a temperature change determining step S06, and a retrieving step S07. In this embodiment, the forcing step S03, the heating step S04, the calibrating step S05, the temperature change determining step S06, and the retrieving step S07 can be executed by the controller 24.

In preparation step S01, the calibration system 1 whose second connectors 132 of the base 13 has the same quantity as the target pressure sensors 15 needed to be calibrated is provided as required. Then, the base 13 is disposed between the communication pipe 11 and the outlet valve 19.

In installing step S02, the target pressure sensors 15 are installed on the base 13. In this embodiment, the order of executing the preparation step S01 and the installing step S02 is changeable as required. In some other embodiments, installing the target pressure sensors 15 onto the base 13 (i.e., the installing step S02) may be in advance of disposing the base 13 between the communication pipe 11 and the outlet valve 19 (i.e., the preparation step S01).

Then, the controller 24 executes the forcing step S03. During this step, the controller 24 opens the inlet valve 12 and the outlet valve 19 and closes the retrieving valve 21. Meanwhile, the controller 24 controls the pump 16 to apply force to the fluid in the storage tank 20 and to push the fluid to flow into the space S defined by the communication pipe 11 and the chamber body 130 via the inlet pipe 25. The fluid flows in a direction towards the chamber body 130 along the communication pipe 11, wherein the flowing direction of the fluid is substantially parallel to the extension direction D. By doing so, the air that existed in the space S defined by the communication pipe 11 and the chamber body 130 is emitted out of the space S and flows into the storage tank 20 via the outlet valve 19, the outlet pipe 23, and the top surface 20b of the storage tank 20. When the space S defined by the communication pipe 11 and the chamber body 130 is filled with the fluid, the controller 24 controls the pump 16 to force the fluid in the space S defined by the communication pipe 11 and the chamber body 130 up to a predetermined pressure. When the pressure of the fluid in the space S reaches the predetermined pressure, the controller 24 closes the inlet valve 12 and the outlet valve 19 to seal the space S defined by the communication pipe 11 and the chamber body 130. By doing so, the fluid in the sealed space S is static and has a static pressure. The static pressure is substantially the hydraulic pressure of the fluid.

Then, the controller 24 executes the heating step S04. During this step, the controller 24 controls the heating portion 170 of the heater 17 to heat the fluid in the space S. According to the temperature detected by the temperature sensor 18, the controller 24 can control the operation of the heating portion 170 of the heater 17 to heat the fluid in the space S to the predetermined temperature.

Then, the controller 24 executes the calibrating step S05. During this step, the controller 24 records the pressure values detected by the reference pressure sensor 14 and the pressure values detected by the target pressure sensors 15. The controller 24 can calibrate the target pressure sensors 15 according to the predetermined pressure, the predetermined temperature and the pressure values detected by the reference pressure sensor 14. In one example, the controller 24 can obtain the images of the reference pressure sensor 14 and the images of the target pressure sensors 15. In this embodiment, the controller 24 is also configured to determine the pressure values of the reference pressure sensor 14 and the pressure values of the target pressure sensors 15 according to the obtained images. The controller 24 stores the predetermined temperature and the determined pressure values of the reference pressure sensor 14 and the determined pressure values of the target pressure sensors 15 in a look-up table. When target pressure sensor 15 is used to measure the pressure of the fluid, the pressure value detected by the target pressure sensor is calibrated to be the determined pressure value detected by the reference pressure sensor 14, wherein the determined pressure value detected by the reference pressure sensor is stored in the look-up table.

Then, the controller 24 can executes the temperature change determining step S06. During this step, the controller 24 determines whether the temperature of the fluid in the space S is to be changed or not and determines whether the pressure of the fluid in the space S to be measured or not. In one example, when the environmental temperature for the target pressure sensors 15 is changed, the controller 24 determines that the temperature of the fluid in the space S should be changed. Then, the predetermined temperature is changed for executing the heating step S04, the calibrating step S05, and the temperature change determining step S06 again. If the environmental conditions for the target pressure sensors 15 is not changed, the controller 24 can then execute the retrieving step S07.

In the retrieving step S07, the controller 24 opens the retrieving valve 21 to let the fluid in the space S defined by the communication pipe 11 and the chamber 130 to flow back to the storage tank 20 from the space S.

In the above embodiment, the space S in the calibration system 1 can be sealed, thus, the fluid in the space S can be considered as a static fluid in sealed pipes. In specific, because the space S in the calibration system 1 and the forcing step S03 can simulate the actual sealed environmental conditions, the calibration of the target pressure sensors 15 will be highly accurate when the target pressure sensors 15 which are used in sealed pipes.

Note that the space S of the calibration system 1 and the forcing step S03 are not limited to simulate sealed pipeline. As discussed below, the space S and the forcing step S03 of the calibration system 1 in some other embodiments may simulate other environmental conditions for the target pressure sensors 15.

In another embodiment, during the forcing step S03, the controller 24 can open the inlet valve 12 and the outlet valve 19 and close the retrieving valve 21. The controller 24 can control the pump 16 to force the fluid to flow out of the storage tank 20 and to flow into the space S defined by the communication pipe 11 and the chamber body 130 via the inlet pipe 25. The fluid flows in a specific direction towards the chamber body 130 along the communication pipe 11, wherein the flowing direction of the fluid is substantially parallel to the extension direction D. By doing so, the air that exists in the space S defined by the communication pipe 11 and the chamber body 130 is emitted out of the space S and flows into the storage tank 20 via the outlet valve 19, the outlet pipe 23, and the top surface 20b of the storage tank 20. When the space S defined by the communication pipe 11 and the chamber body 130 is filled with the fluid, the controller 24 opens the inlet valve 12 and the outlet valve 19 and controls the pump 16 to force the fluid in the space S defined by the communication pipe 11 and the chamber body 130 up to a predetermined pressure. The forced fluid fills the space S and keeps flowing in the flowing direction towards the chamber body 130 along the communication pipe 11. At this moment, the fluid applies a dynamic pressure to the space S. This dynamic pressure is substantially the hydraulic pressure. Then, the controller 24 executes the heating step S04. In this embodiment, the space S and the forcing step S03 are used to simulate a non-sealed pipe in which the fluid can flows.

In another embodiment, during the forcing step S03, the controller 24 can open the inlet valve 12 and the outlet valve 19 and close the retrieving valve 21, and the controller 24 controls the pump 16 to force the fluid to flow out of the storage tank 20 and to flow into the space S defined by the communication pipe 11 and the chamber body 130 via the inlet pipe 25. The fluid flows in a specific direction towards the chamber body 130 along the communication pipe 11, wherein the flowing direction of the fluid is substantially parallel to the extension direction D. By doing so, the air that existed in the space S defined by the communication pipe 11 and the chamber body 130 is emitted out of the space S and flows into the storage tank 20 via the outlet valve 19, the outlet pipe 23, and the top surface 20b of the storage tank 20. When the space S defined by the communication pipe 11 and the chamber body 130 is filled with the fluid, the controller 24 opens the inlet valve 12 but closes the outlet valve 19. Then, the controller 24 controls the pump 16 to force the fluid in the space S defined by the communication pipe 11 and the chamber body 130 up to a predetermined pressure. At this moment, the space S defined by the communication pipe 11 and the chamber body 130 is sealed except the first opening 11a. Then, the controller 24 executes the heating step S04. In this embodiment, the space S and the forcing step S03 are used to simulate an environments of pipes which are sealed except one opening. In the simulated environments of pipes, the fluid is forced by the pump.

According to the calibration systems as discussed in the above embodiments of the disclosure, the heater and the reference pressure sensor are disposed in the communication pipe and the target sensors needed to be calibrated is disposed in the chamber body, such that the heater can be used to heat the fluid existing in the space defined by the communication pipe and the chamber body. Thus, in the calibration system, the volume of the fluid needed to be heated is reduced, such that the time and energy that are required by the heater are reduced, thereby significantly saving the time and energy consumed by the calibration of the pressure sensor.

In addition, the heating portion of the heater is located between the second opening of the communication pipe and the reference pressure sensor. That is, the heating portion is located between the base and the reference pressure sensor. Thus, whether the space is completely sealed or sealed except one opening, the heating portion heats the fluid around the reference pressure sensor and the target pressure sensors which are needed to be calibrated up to the same temperature within a short time period.

Further, the base is detachable from the communication pipe and the outlet valve, thus it is allowed to select a suitable base according to the quantity of the pressure sensors needed to be calibrated. And the base may have plural second connectors to support plural sensors needed to be calibrated at once.

Moreover, the calibration system enables the controls of the inlet valve, the outlet valve, the temperature and pressure of the space between the inlet valve and the outlet valve, thus the calibration system is able to rapidly simulate various environmental conditions which are similar with or the same as the actual environmental conditions in pipes (e.g., static fluid in fully sealed pipes or dynamic fluid in not sealed pipes). It ensures that the sensor calibrations will be highly accurate under various environmental conditions.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A calibration system, for calibrating at least one target pressure sensor, the calibration system comprising:
   a communication pipe comprising a first opening and a second opening;
   a base comprising a chamber body and an outlet disposed at one end of the chamber body;
   an inlet valve connected to the first opening;
   an outlet valve disposed at the outlet, wherein another end of the chamber body is connected to the second opening of the communication pipe, the communication pipe communicates with the chamber body, and the communication pipe and the chamber body define a space located between the inlet valve and the outlet valve;
   a pump;
   an inlet pipe connected to the pump and the inlet valve;
   a heater configured to heat a fluid in the space; and
   a reference pressure sensor disposed on the communication pipe and configured to measure a pressure of the fluid in the space, wherein the at least one target pressure sensor is detachably mounted on the chamber body to measure the pressure of the fluid in the space.

2. The calibration system according to claim 1, wherein the heater is disposed on the communication pipe.

3. The calibration system according to claim 1, wherein when the inlet valve and the outlet valve are opened, the pump forces the fluid in the space to flow towards the chamber body along the communication pipe and to fill the space, the fluid applies a dynamic pressure to the space, the pressure of the fluid is substantially equal to the dynamic pressure.

4. The calibration system according to claim 1, wherein the pump is configured to force the fluid to fill the space, when the inlet valve and the outlet valve are closed, the space is sealed, the fluid in the space is static and applies a static pressure to the space, the pressure of the fluid is substantially equal to the static pressure.

5. The calibration system according to claim 1, wherein the pump is configured to force the fluid to fill the space, when the inlet valve is opened and the outlet valve is closed, the fluid in the space is static and applies a static pressure to the space, the pressure of the fluid is substantially equal to the static pressure.

6. The calibration system according to claim 1, further comprising a storage tank and an outlet pipe, wherein the outlet pipe is connected to the outlet valve and the storage tank.

7. The calibration system according to claim 1, wherein when the space is not filled with the fluid, the outlet valve is opened to emit air from the space.

8. The calibration system according to claim 1, wherein the heater comprises a heating portion disposed in the communication pipe.

9. The calibration system according to claim 8, wherein the heating portion of the heater is located between the second opening and the reference pressure sensor.

10. The calibration system according to claim 1, wherein the base further comprises a first connector and at least one second connector, the first connector is detachably mounted at the second opening of the communication pipe, the at least one target pressure sensor is detachably mounted on the at least one second connector.

11. The calibration system according to claim 10, wherein the chamber body comprises a side surface and a top surface located adjacent to each other, the first connector is disposed on the side surface, the at least one second connector is disposed on the top surface.

12. The calibration system according to claim 11, wherein the first connector is detachably mounted on the side surface of the chamber body, and the at least one second connector is detachably mounted on the top surface of the chamber body.

13. The calibration system according to claim 1, further comprising a temperature sensor disposed in the communication pipe and configured to detect a temperature of the fluid in the space.

14. The calibration system according to claim 1, further comprising a storage tank, wherein the inlet pipe is connected to the storage tank, the pump, and the inlet valve, and the pump is located between the storage tank and the inlet valve.

15. The calibration system according to claim 14, further comprising a retrieving pipe and a retrieving valve, the communication pipe further comprising a third opening, wherein the retrieving valve is connected to the third opening, and the retrieving pipe is connected to the retrieving valve and the storage tank.

16. The calibration system according to claim 1, further comprising a controller electrically connected to the pump and the heater and wherein the controller is configured to execute steps comprising:
   a forcing step comprising controlling the pump to force the fluid in the space to a predetermined pressure by the controller;

a heating step comprising controlling the heater to heat the fluid in the space to a predetermined temperature by the controller; and a calibrating step comprising calibrating the at least one target pressure sensor according to the predetermined pressure and the predetermined temperature by the controller.

17. The calibration system according to claim 16, wherein the controller is electrically connected to the inlet valve, the forcing step further comprises opening the inlet valve by the controller to make the fluid flow into the space and fill the space, and closing the inlet valve by the controller to seal the space when the fluid in the space is forced to the predetermined pressure, wherein the heating step is executed after the forcing step.

18. The calibration system according to claim 16, wherein the controller is electrically connected to the inlet valve and the outlet valve, and the forcing step further comprises opening the inlet valve by the controller to make the fluid flow into the space and fill the space, and opening the inlet valve and closing the outlet valve by the controller to seal the space except the first opening when the fluid in the space is forced to the predetermined pressure, wherein the heating step is executed after the forcing step.

19. The calibration system according to claim 16, wherein the controller is electrically connected to the inlet valve and the outlet valve, and the forcing step further comprises opening the inlet valve by the controller to make the fluid flow into the space and fill the space, and opening the inlet valve and the outlet valve by the controller s to make the fluid in the space flows towards the chamber body along the communication pipe when the fluid in the space is forced to the predetermined pressure, wherein the heating step is executed after the forcing step.

20. The calibration system according to claim 16, further comprising a temperature sensor disposed in the communication pipe, wherein the controller is electrically connected to the temperature sensor, and the heating step further comprises controlling the heater according to a temperature measured by the temperature sensor.

21. The calibration system according to claim 16, further comprising a storage tank, wherein the inlet pipe is connected to the storage tank, the pump and the inlet valve, the pump is located between the storage tank and the inlet valve, and the forcing step further comprises controlling the pump to force the fluid stored in the storage tank to flow into the space via the inlet pipe.

22. The calibration system according to claim 21, further comprising a retrieving pipe, a retrieving valve, and a third opening disposed on the communication pipe, wherein the retrieving valve is connected to the third opening, the retrieving pipe is connected to the retrieving valve and the storage tank, the controller is electrically connected to the retrieving valve, the controller is configured to execute a retrieving step comprising opening the retrieving valve to make the fluid in the space flow back to the storage tank via the retrieving pipe.

23. The calibration system according to claim 16, wherein the controller is electrically connected to the outlet valve, the forcing step further comprises opening the outlet valve to emit air out of the space and closing the outlet valve when the fluid fills the space.

\* \* \* \* \*